United States Patent [19]
Matsumoto

[11] 3,758,961
[45] Sept. 18, 1973

[54] EDUCATIONAL DEVICE
[75] Inventor: Teruo Matsumoto, Tokyo, Japan
[73] Assignee: Epoch Company Ltd., Tokyo, Japan
[22] Filed: Apr. 25, 1972
[21] Appl. No.: 247,475

[52] U.S. Cl. ................................................ 35/9 A
[51] Int. Cl. ............................................ G09b 3/06
[58] Field of Search .................. 35/9 R, 9 A; 40/78, 40/78.03, 79

[56] References Cited
UNITED STATES PATENTS
| | | | |
|---|---|---|---|
| 2,213,974 | 9/1940 | Baker | 35/9 A UX |
| 2,760,274 | 8/1956 | Baker | 35/9 A |
| 3,246,402 | 4/1966 | Diamond | 35/9 A |

*Primary Examiner*—Wm. H. Grieb
*Attorney*—James D. Halsey, Jr.

[57] ABSTRACT

An educational device featuring a housing provided with a slot within which a plurality of cards containing problems and multiple choice answers thereto are inserted, the housing being further provided with a plurality of buttons operatively connected to a plurality of fingers normally extending within the slot, the cards each being further provided with coded cut-out portions adjacent the correct answers, the fingers normally extending through the coded cut-out portions preventing the card from moving while actuation of the correct buttons withdraws the fingers from the coded cut-out portions permitting the card to move outwardly within the slot under the influence of a spring biasing mechanism to the next problem to be solved, after which the sequence is repeated.

2 Claims, 8 Drawing Figures

EDUCATIONAL DEVICE

BACKGROUND OF THE INVENTION

The present invention relates generally to educational devices in which the child is presented with a series of problems and multiple choice answers thereto. Such teaching devices are usually expensive, complicated in construction, fail to retain the child's interest and limited in the number and variety of problems that can be presented in a given period of time. In contrast, the present invention utilizes a simple mechanical housing construction into which an infinite number of problem-containing cards may be inserted while stimulating the child's continued interest in playing the game.

SUMMARY OF THE INVENTION

The educational device of the present invention features a housing provided with a slot within which are inserted a plurality of cards. Each of the cards is provided with a plurality of problems to be solved and multiple choice answers thereto. A card after being inserted within the slot is locked in place and is permitted to move outwardly to display additional problems only after the child selects the correct answer to the problem. The housing is provided with a plurality of buttons corresponding to the multiple choice answers appearing on the cards. Upon actuation of the buttons corresponding fingers normally positioned within the slot of the housing are withdrawn. Within each section of the card wherein multiple choice answers are displayed is provided a coded cut-out portion adjacent the correct answer. One of the fingers extends through the coded cut-out portion preventing the card from moving. As the correct answer is chosen by depressing the correct button the finger is withdrawn from the coded cut-out portion permitting the card to move forward under the force of a spring mechanism until the next problem is reached at which time another of the fingers extends through the next coded cut-out portion stopping movement of the card until the next correct answer is selected. The sequence is repeated until the child has correctly answered all of the problems on each card.

Figure 1:
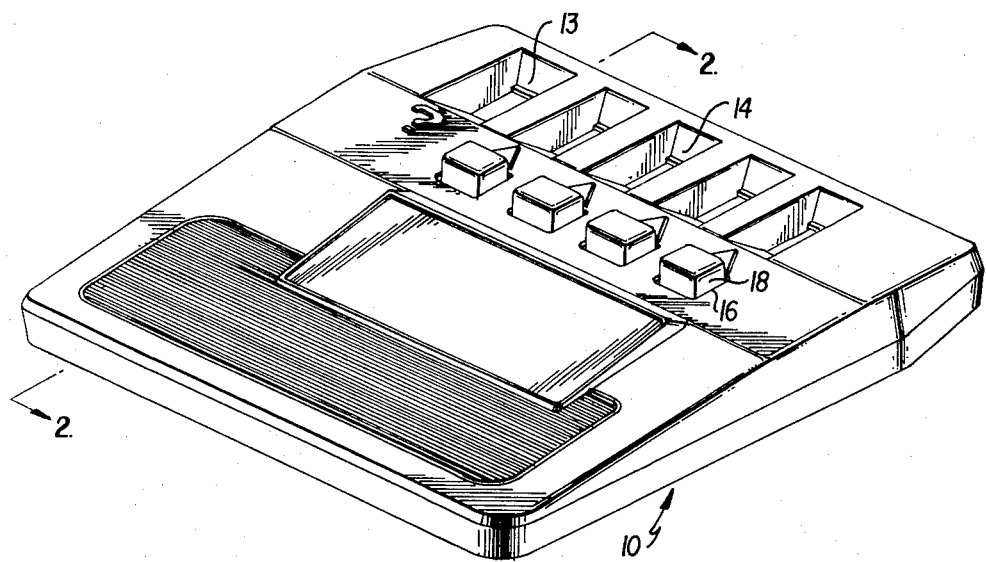
FIG. 1 is a perspective view of the educational device embodying the present invention.

DESCRIPTION OF THE PREFERRED EMBODIMENT:

The educational device is generally designated by reference numeral 10 in FIG. 1 and comprises a housing 12 provided with a first window 13 through which the child views the problem and four adjacent windows 14 through which the child views possible answers thereto, as explained in detail hereinafter. Directly below each of the windows 14 is an opening 16 through which buttons or actuating members 18 protrude.

Figure 2:
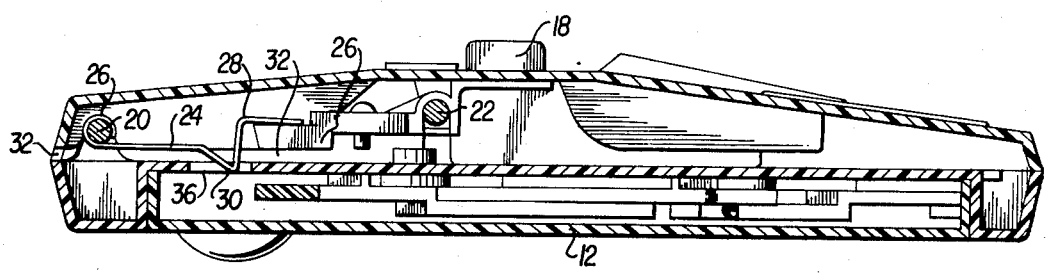
FIG. 2 is a cross-sectional view taken along line 2—2 of FIG. 1 illustrating the housing of the educational device and one of the fingers normally extending downwardly through the slot within which the problem-containing cards are inserted.
Figure 7:
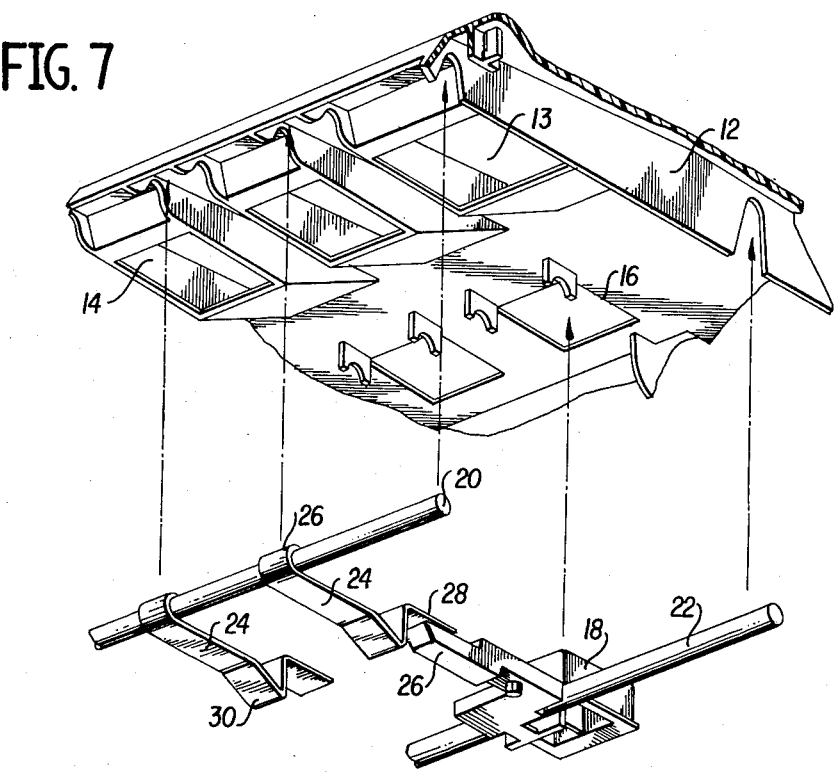
FIG. 7 is a perspective view of a portion of the housing illustrating installation of the fingers and corresponding actuating buttons.

Within the housing 12 are mounted rods 20 and 22, as illustrated in FIGS. 2 and 7. Four fingers generally designated by reference numeral 24 have first ends 27 rotatably secured to the rod 20. Rotatably mounted about rod 22 are the four corresponding actuating members 18 which terminate in end portions 26 which engage the flanges 28 of the fingers 24. As illustrated in FIG. 2, in their normal position the generally V-shaped mid portions 30 of the fingers 24 extend within a slot 32 formed within the housing 12 within which the problem cards 34 are inserted, the fingers 24 thereafter extending through openings 36 formed within the housing 12.

Figure 3:
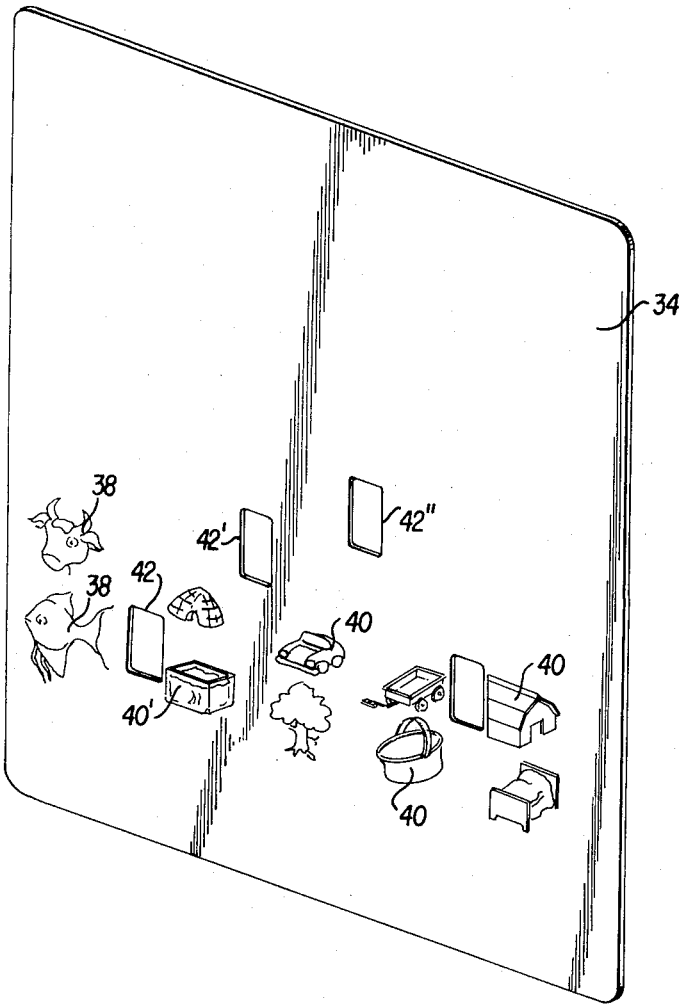
FIG. 3 is a perspective view of a representative card containing a series of problems in which the child is required to match one of four pictures in each column with the single left-hand picture in each column, a coded cut-out portion being adjacent the correct choice it being understood that the card may contain a similar series of problems and multiple choice answers on the opposite side thereof appropriately coordinated with the coded cut-out portions.

Turning now to FIG. 3, each of the cards 34 is provided on the left side with rows of indicia 38 designating problems to be solved or pictures to be matched. The problems 38 are viewed through the window 13 of the housing 12. To the right of each problem 38 are indicia 40 designating four possible answers or matches to the problem set forth by indicia 38, the multiple answers 40 being viewed through the windows 14 of the housing 12. In the problem illustrated in the lowest row of card 34 in FIG. 3, the object is for the child to match the fish 38 with one of the pictures designated by the indicia 40, i.e., the fish bowl, tree, basket and bed. Adjacent the indicia 40' designating a fish bowl which is the correct answer is a coded cut-out portion 42, the purpose of which will now be described. It is to be understood that both sides of each card 34 contain problems and answers appropriately coordinated with the coded cut-out portions 42. It is to be understood that each of the cards 34, as illustrated in FIG. 3, may be provided with additional indicia designated problems to be solved and possible answers thereto appropriately coordinated with the existing coded cut-out portions 42. In this manner, after the child has solved all of the problems on one side, the card 34 may be flipped over and reinserted in place, after which the child may begin solving the new problems.

Figure 4:
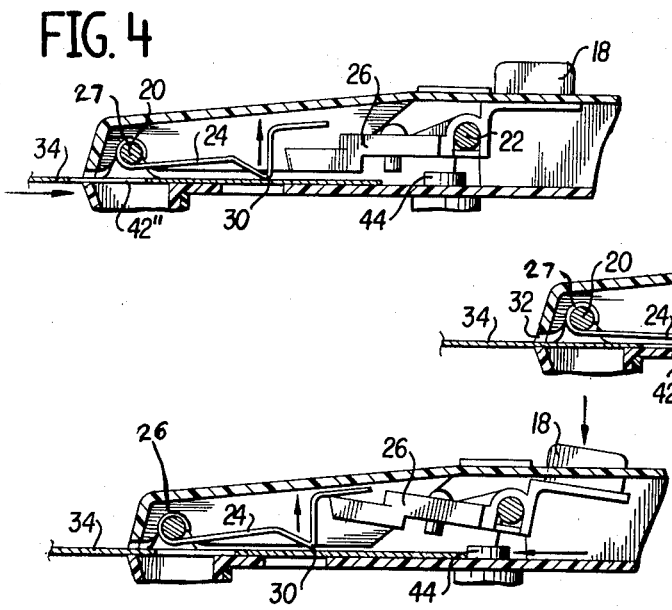
FIG. 4 is a cross-sectional view of a portion of the housing illustrating a card being inserted within the slot at which time the fingers are pushed upwardly.
Figure 5:
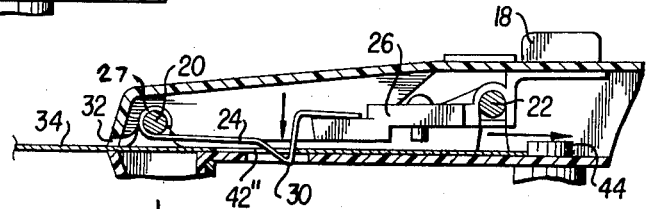
FIG. 5 is a cross-sectional view of a portion of the housing illustrating one of the fingers extending downwardly into a coded cut-out portion corresponding to the correct answer, at which time the card is locked in place within the slot.
Figure 6:
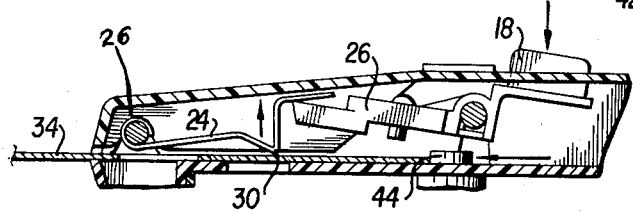
FIG. 6 is a cross-sectional view of a portion of the housing illustrating a button corresponding to the correct answer being depressed by the user at which time its corresponding finger normally passing through the coded cut-out portion is raised so as to permit the card to move forward to its next problem under the influence of a spring biasing mechanism.

As the card 34 is inserted within the slot 32 of the housing 12, as illustrated in FIG. 4, the solid portions of the card 34 push the V-shaped portions 30 of the fingers 24 upwardly. When the card 34 is inserted all the way within the slot 32, as illustrated in FIG. 5, the V-shaped portion 30 of one of the fingers 24 passes downwardly within the uppermost coded cut-out portion 42'', illustrated in FIG. 3, thus locking the card 34 in place. If the child selects the correct answer and presses the correct button 18 its corresponding finger 24 is raised releasing the card 34, as seen in FIG. 6. At this time, the card 34 is moved forwardly by the legs 44 of the biasing mechanism illustrated in FIG. 8 which will be described in detail hereinafter. The card 34 moves forward until one of the fingers 24 corresponding to the correct answer to the problem of the next row drops downwardly within the next coded cut-out portion 42'.

Figure 8:
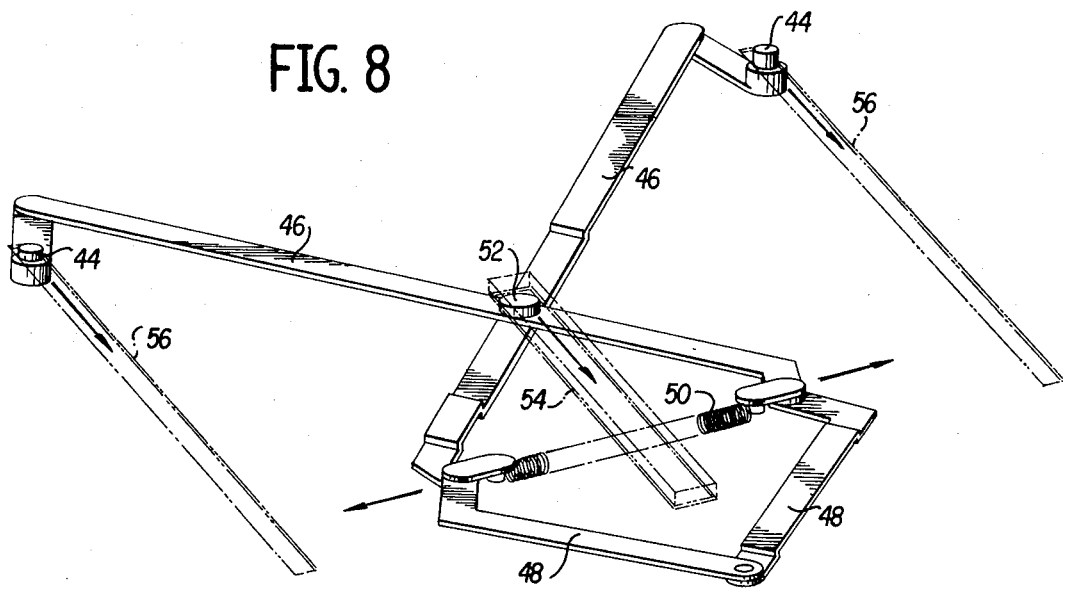
FIG. 8 is a perspective view illustrating the spring-biased mechanism for urging the cards forward within the housing.

The mechanism for urging the card 34 forward within the housing 12 is illustrated in FIG. 8 and comprises pivotably mounted linkage members 46 and 48 connected by the spring element 50. The centermost pivot point 52 is mounted to slide within a channel 54 formed as an integral part of the casing 12 while the legs 44 are mounted to slide within openings 56 formed within the housing 12. As will be apparent, the force of the spring 50 urges the arms 44 upwardly in such manner as to urge the card 34 out of the housing 12. In this manner, as soon as the child correctly answers the problem of one row, the card 34 automatically advances to the next row.

I claim:

1. An educational device, comprising:
   a generally flat housing adapted to rest on a supporting surface;
   a slot formed horizontally within said housing;
   a plurality of fingers having ends freely mounted about a rod within said housing, said fingers further being provided with portions generally perpendicular to said slot and normally extending downwardly therein;
   a plurality of actuating members mounted on said housing corresponding to said fingers, said actuating members operatively connected to said fingers such that as each of said actuating members is operated said perpendicular portion of the finger corresponding to said actuating member is raised above said slot;
   a card inserted within said slot, said card being provided with rows of indicia, each row designating a problem and multiple choice answers to said problem, said card being further provided with coded cut-out means adjacent that portion of said indicia in each row designating the correct answer to said problem, that one of said fingers corresponding to the correct answer normally extending through said coded cut-out means preventing said card from moving within said slot, the operation of said actuating member corresponding to that one of said fingers corresponding to the correct answer thus causing same to be withdrawn from said coded cut-out means so as to release said card within said slot; and
   means urging said card outwardly of said slot to pass from one row of said indicia to another, comprising oppositely disposed legs extending within said slot, said legs supporting the innermost end of said card, linkage means connecting said legs and resilient means normally urging said linkage means to move said legs in unison within said slot from the innermost end thereof outwardly until another of said perpendicular portions of said fingers falls downwardly through said coded cut-out means in the next row of indicia.

2. An educational device as in claim 1, wherein said indicia is located on both sides of said card and arranged to correspond with said coded cut-out means.

* * * * *